(12) United States Patent
Killis (10) Patent No.: US 10,872,005 B1
(45) Date of Patent: Dec. 22, 2020

(54) FIXED LENGTH MESSAGE GENERATION TOOL

(71) Applicant: Sprint Communications Company L.P., Overland Park, KS (US)

(72) Inventor: Erny Killis, Crozet, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/429,889

(22) Filed: Jun. 3, 2019

(51) Int. Cl.
*G06F 9/54* (2006.01)
*G06F 3/0482* (2013.01)

(52) U.S. Cl.
CPC ............ *G06F 9/546* (2013.01); *G06F 3/0482* (2013.01)

(58) Field of Classification Search
None
See application file for complete search history.

(56) References Cited

U.S. PATENT DOCUMENTS

2007/0044069 A1 * 2/2007 Doucette

\* cited by examiner

*Primary Examiner* — Syed A Roni (57) ABSTRACT

A method of building a fixed length message by a software tool. The method comprises presenting a fixed length message creation screen by the software tool in a user interface based on a parser definition (PDEF) file associated with an application programming interface (API), receiving a selection of a sequence button presented in the fixed length message creation screen by the software tool, in response to receiving the selection of the sequence button, presenting a plurality of add element screens by the software tool in the user interface, receiving data input into each of the add element screens by the software tool, and creating a fixed length message by the software tool based on the data input into each of the add element screens and on data in other fields of the fixed length message creation screen.

19 Claims, 9 Drawing Sheets

FIXED LENGTH MESSAGE GENERATION TOOL

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Computer systems may comprise a front-end application layer, a middleware communication layer, and a back-end database layer. The front-end applications may desirably be isolated from each other, so that they do not interfere with each other or impede maintenance of the applications. The middleware communication layer permits some decoupling between the front-end applications and the back-end databases. For example, a front-end application requesting service from a database may send a message to the middleware communication layer and go on about its other business. The middleware communication layer can queue the message until the back-end database is ready to retrieve the queued message and process it. When the back-end database has processed the message (e.g., has written data to the database), it may send a response back to the requesting front-end application in a response message that it sends to the middleware communication layer. The middleware communication layer can queue the response message until the front-end application is ready to retrieve the queued response message and process it. The messages that are sent in this three-tier architecture may have different formats. Each different format may be referred to as an application programming interface (API). In some cases the APIs define fixed length messages that comprise a plurality of different fields, where each field consists of a predefined and fixed number of characters or symbols.

SUMMARY

In an embodiment, a method of building a fixed length electronic communication message by a software tool is disclosed. The method comprises generating a plurality of parser definition (PDEF) files, where each PDEF file is generated based on a different application programming interface (API) specification of a fixed length message format, reading the PDEF files by a software tool executing on a computer system, and creating software classes based on reading the PDEF files by the software tool. The method further comprises presenting a list of APIs in a user interface by the software tool, where each listed API corresponds to one of the PDEF files, receiving a selection of one of the listed APIs by the software tool, and presenting a fixed length message creation screen by the software tool in the user interface based on the created software classes and based on the selection of the one of the listed APIs. The method further comprises truncating data input to a first field of the fixed length message creation screen by the software tool, where the data input to the first field exceeds a fixed length of the first field defined by the software classes, padding data input to a second field of the fixed length message creation screen by the software tool, where the data input to the second field is shorter than a fixed length of the second field defined by the software classes, and creating a fixed length message by the software tool based on the truncated data in the first field, on the padded data in the second field, and on data in other fields of the fixed length message creation screen.

In another embodiment, a computer system is disclosed. The computer system comprises a processor, a non-transitory memory, a plurality of parser definition (PDEF) files stored in the non-transitory memory, where each PDEF file defines a fixed length message format of a different application programming interface (API), and a message generation application stored in the non-transitory memory. When executed by the processor, the message generation application presents a list of APIs in a user interface, where each listed API corresponds to one of the PDEF files, receives a selection of one of the listed APIs, and presents a fixed length message creation screen in the user interface, wherein the fixed length message creation screen is dynamically generated based on a PDEF file associated with the selected API. The message generation application further truncates data input to a first field of the fixed length message creation screen, where the data input to the first field exceeds a fixed length of the first field defined by the PDEF file associated with the selected API, pads data input to a second field of the fixed length message creation screen, where the data input to the second field is shorter than a fixed length of the second field defined by the PDEF file associated with the selected API, and creates a fixed length message based on the truncated data in the first field, on the padded data in the second field, and on data in other fields of the fixed length message creation screen.

In yet another embodiment, a method of building a fixed length electronic communication message by a software tool is disclosed. The method comprises presenting a list of APIs in a user interface by a software tool executing on a computer, where each listed API corresponds to one of a plurality of parser definition (PDEF) files, where each PDEF file defines a fixed length message format of a different application programming interface (API), receiving a selection of one of the listed APIs by the software tool, and presenting a fixed length message creation screen by the software tool in the user interface based on a PDEF file associated with the selected API. The method further comprises receiving a selection of a sequence button presented in the fixed length message creation screen by the software tool, in response to receiving the selection of the sequence button, presenting a plurality of add element screens by the software tool in the user interface, receiving data input into each of the add element screens by the software tool, and creating a fixed length message by the software tool based on the data input into each of the add element screens and on data in other fields of the fixed length message creation screen. The method further comprises presenting the fixed length message on the user interface by the software tool, presenting a fixed length message parser screen by the software tool in the user interface, copying the fixed length message presented on the user interface and pasting the fixed length message into an input field of the fixed length message parser screen, parsing the fixed length message by the software tool into a plurality of fields, and based on parsing the fixed length message, presenting data in the plurality of fields on the user interface by the software tool.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a system and method for automatically generating a fixed length message from a plurality of values entered into fields and of automatically generating a plurality of value filled fields from a fixed length message. Said in other words, a bidirectional fixed length message generator and parser is disclosed. The bidirectional generator and parser may be referred to as a software tool. The software tool may execute in a variety of computer environments, including but not limited to a MS Windows computer environment and a UNIX computer environment.

The bidirectional fixed length message generator and parser tool may be used by developers of information technology (IT) and/or of software for computer systems to test software before deploying that software to a production computer system, for example before deploying new or modified software to a communication service provider's core network. When new application programming interfaces (APIs) are delivered in a new release of software, testing the software systems involved may entail sending complex fixed length communication messages to a software application to test that application's ability to receive and handle those messages. Such API messages may comprise dozens of different fields where each field may have a different stipulated fixed length. If a test message is sent that has one too many symbols in a field or one too few symbols in a field, the test may fail or not provide the desired test of the receiving software application. Said in other words, an improperly formatted test message can cause false positive test results or false negative test results.

In the past, such fixed length messages have been built and/or generated manually by the testers, taking significant time and money. The slow process of building and/or generating fixed length messages further may constrain the amount of testing that is performed, because typically such software testing is budget and time constrained and when either budget or time run out, the software is deemed to have completed testing. The bidirectional fixed length message generator and parser tool disclosed herein makes the process of building and/or generating test messages much more efficient and trouble free. This both saves time and money and promotes more robust and thorough testing of new software applications.

A parser definition (PDEF) file is created to define the structure of each API to the software tool (i.e., the bidirectional generator and parser). Because APIs may evolve over the course of a development project and over the course of multiple production releases, the PDEF file associated with an API may provide definitions of the structures of multiple different versions of the same API. An information technology (IT) worker may craft the PDEF files from API specifications provided by systems analysts or by software developers. The IT worker may craft the PDEF files using any suitable computer tool and/or computer environment, for example using a MS Windows computer environment, a UNIX computer environment, or another environment. The PDEF files define header formats for the API messages as well as formats of the data fields or parameter fields of the API messages. The PDEF files define the number of symbols or characters that each field consists of. In an embodiment, the software tool supports nesting of PDEF files. A PDEF file may comprise fields and records and sequences. Some of the fields, records, and sequences of a PDEF file can in turn contain another field, record, and/or sequence and so on which may be defined in a separate PDEF file.

When the tool is initiated, it reads each of the PDEF files (e.g., at least one PDEF file for each different API message). In an embodiment, the tool generates Java classes based on the PDEF files. The PDEF files can be considered to be inputs to the bidirectional fixed length message generator and parser tool. Alternatively, the PDEF files may be viewed as data that the tool uses to configure itself on initialization. From this point of view, the software tool can be seen to be a data driven application. One of the benefits of implementing the software tool in this way is that once the software tool has been developed and tested, it need no longer be changed to accommodate changes in existing APIs or changes resulting from newly added APIs. Modifications of existing APIs or addition of new APIs are accommodated by changing the PDEF files—changing data. It will be appreciated that changing data files and getting data to conform to data definition formats is a less error prone process than changing software code, instructions, or logic. Thus, the software tool taught herein provides an improved computer system from several different points of view.

The tool presents an initial control screen on a user interface screen that allows a user to scroll through to see all the available API messages supported and to select one these API message formats. In some contexts, the API message format may be referred to as a parser. When the user selects an API message format he or she may select to convert from a fixed length message to a field-by-field parsed display of the data values embedded in the fixed length message (referred to as convert fixed length to parser) or to convert from a field-by-field entry of data values to a fixed length message (referred to as convert parser to fixed length).

If the convert fixed length to parser button is actuated, a user interface to prompt the user to enter a continuous fixed length message string is presented to the user, for example on a display screen of the user's workstation. The user may first be prompted to select an API version (e.g., a business transaction version). When the user has input this string and clicked the convert button, the tool parses the continuous fixed length message string and populates the parsed values into the appropriate fields of the API version, based on the PDEF files and/or the Java classes.

If the convert parser to fixed length button is actuated, a user interface to prompt the user to enter data into individual fields of the fixed length message is presented. The user may first be prompted to select an API version. Depending on what API version the user selects, the fields and field constraints provided in the user interface may change. This aspect of the user interface may be referred to as a dynamic graphical user interface (dynamic GUI). It may be said that the tool dynamically generates and presents a fixed length message screen.

If the user enters too many symbols (e.g., more symbols than the number of symbols defined for the field by the PDEF file and/or the Java classes derived from the PDEF files), the tool truncates the input to comply with the fixed length restriction of the field. If the user enters too few symbols, the tool pads out the input to comply with the fixed length restriction of the field. When padding out a field, the tool may add blank characters or some other conventional character. The user may input data values for a header portion of the message. The user may input data values for data portions of the message. When the user has completed entry of data into the fields of the message, he or she may actuate a save button to save the values entered into the fields and actuate a convert to fixed length message button to trigger the tool to generate a fixed length message based on the field values.

The fixed length message generated by the tool may be displayed in a portion of a window of the presentation screen. The user may cut this fixed length message string and paste it into a separate window of his or her workstation, for example into a user interface of a message sending tool for sending to a messaging middleware system. Alternatively, the tool may have an interface to directly communicate with the messaging middleware system and may send the message to the middleware system directly itself. The fixed length message is a long string of symbols or characters—possibly several hundred symbols long. The fixed length message can be cut and pasted into the convert fixed length to parser user interface and converted back to parsed field values, whereby the correctness of the data fill into the convert parser to fixed length can be verified.

Some fields of the convert parser to fixed length user interface may contain a sequence of objects, where each object comprises a plurality of fields. These objects may be referred to in some contexts as record structures. When this is the case, the convert parser to fixed length user interface provides a selection button to pop-up a screen to input the desired data values into fields of the object. The sequence object input screen comprises input fields for each of the predefined fields of the object, a clear button, and an add element button. The clear button resets the values of the fields of the object to blanks, allowing the user to provide new values. The add button, when actuated, allows the user to input values for the next object in the sequence of objects. As with other fields of the convert parser to fixed length user interface, the inputs to the fields of the objects in the sequence are padded out or truncated, as needed, to constrain the fields to the field fixed length defined by the PDEF files and/or the classes. The tool may further support adding objects, modifying objects, and deleting objects to a sequence.

In some cases, fields of the sequence objects themselves are sequences of objects. By clicking on such fields within a top-layer sequence object, a lower-layer sequence object input screen can be opened by clicking on the subject field. This lower-layer sequence object itself may also comprise one or more fields that are themselves sequences. Ultimately, only simple fields will be presented, the user can input the needed simple field values, and recursively lift back up from the lower layers to complete the definition of intermediate and top-layer objects of the sequence. The software tool allows modifications to data in a sequence object. In other words, let's say a user has created a sequence of five objects, and decide to modify a field in one of the objects. The software tool allows the user to open the sequence display, go to a field in the object, right click on the field, select modify value, and then enter the new data. In addition to this, if a user decides to delete one of the records of the sequence, the user may simply right click and select delete. The record will be deleted and the sequence display will reflect the latest modifications. The sequence objects may be defined in PDEF files. Sequence objects that are embedded in or nested in a higher level sequence object may also be defined by PDEF files. In this case, a PDEF file may nest within itself references to other PDEF files.

It is noted that the tool provides great convenience to the tester but further contributes to accuracy by actively prompting and coaching the user to enter the correctly formatted data. For example, the tool prompts the user to enter one or more sequence objects and then further prompts the user what fields these objects comprise. If too much data is entered—if a predefined fixed length of a field is exceeded—the tool adapts the user inputs accordingly by truncating the input string. If too little data is entered, the tool adapts the user inputs accordingly by padding out the input string to the correct length. This allows the testing to proceed more rapidly and with fewer "do overs" because the tester fears he or she has entered faulty data into the fixed length message. The ability to cut and paste the fixed length message from the output window of the convert parser to fixed length message to the input window of the convert fixed length message to parsed fields of the API promotes rapidly checking that the appropriate values are in the proper places. This tool can make testing infrastructure more efficient and productive. This tool can improve testing efforts, contributing to delivering higher quality software in product releases.

Figure 1:
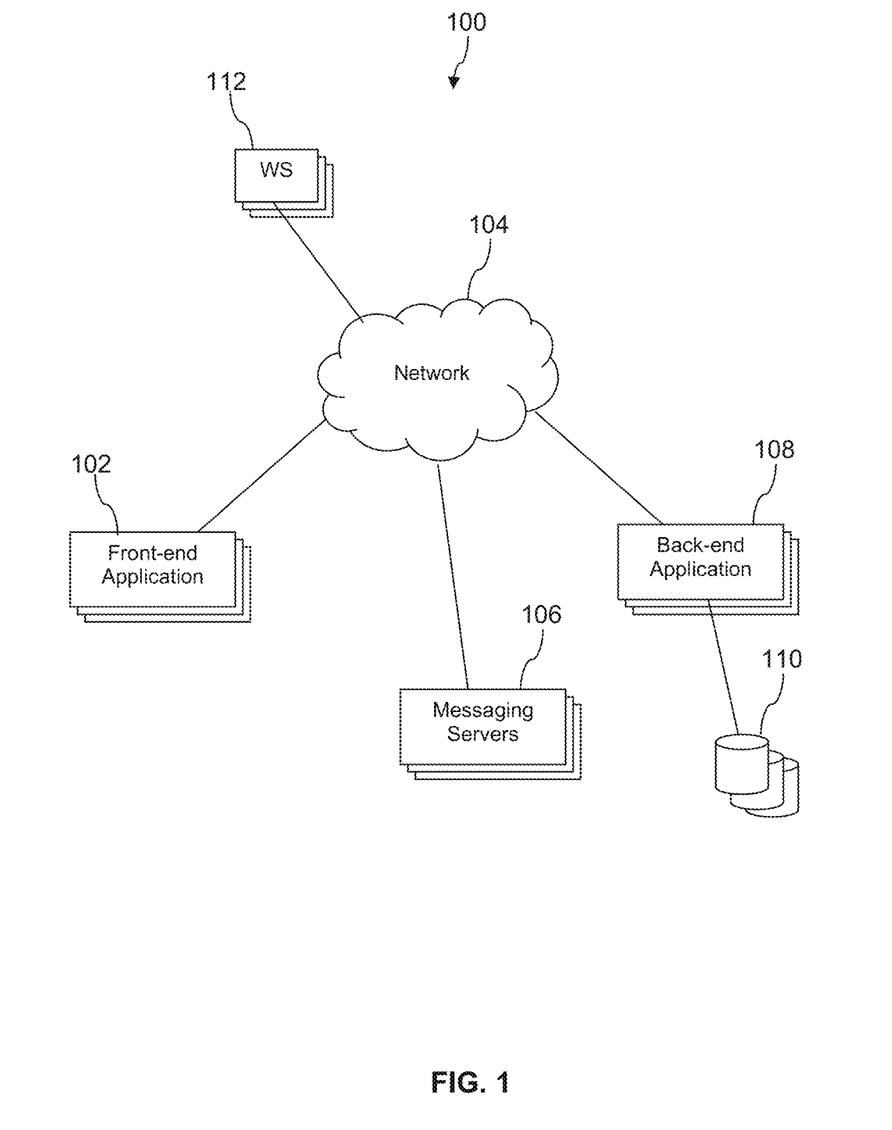
FIG. 1 is a block diagram of a communication system 100 according to an embodiment of the disclosure.

Turning now to FIG. 1, a communication system 100 is described. In an embodiment, the system 100 comprises a plurality of front-end applications 102, a network 104, a plurality of messaging servers 106, a plurality of back-end applications 108, a plurality of data stores 110, and a plurality of workstations 112. The network 104 comprises one or more private networks, one or more public networks, or a combination thereof. In an embodiment, the front-end-applications 102, the messaging servers 106, the back-end applications 108, and the data stores 110 comprise a communication service provider's core network actively providing communication services to subscribers (e.g., a live or production environment). Alternatively, some or all of the front-end-applications 102, the messaging servers 106, the back-end applications 108, the data stores 110, and the workstations 112 comprise a test environment that duplicates a communication service provider's core network (e.g., a test environment). The workstations 112 may be desktop computers, laptop computers, tablet computers, or notebook computers. The workstations 112 may execute a messaging tool application for generating fixed length messages to test the ability of the front-end applications 102 to support an application programming interface (API) and/or the ability of the back-end applications 108 to support an API. In an embodiment, the messaging servers 106 may be a message queue (MQ) servers.

Figure 2:
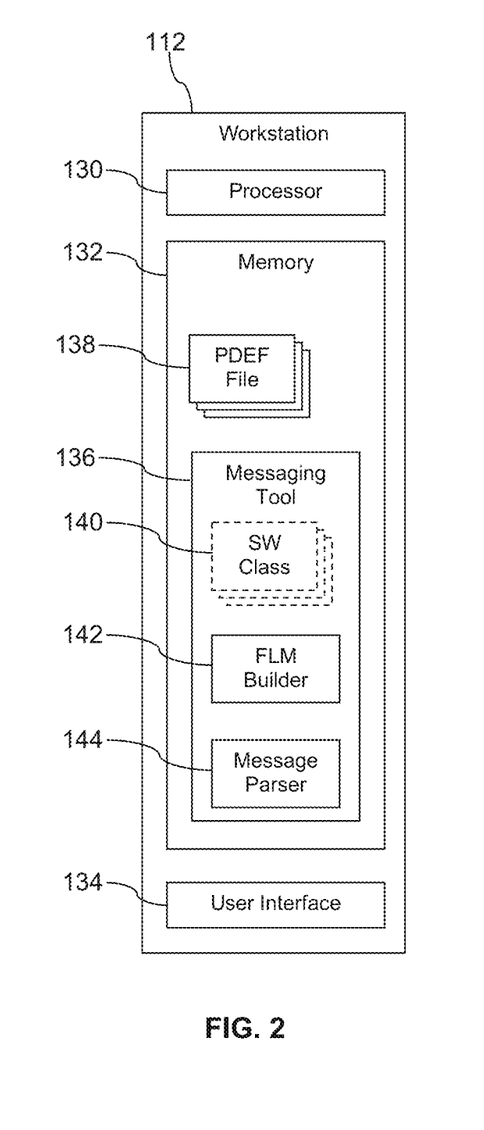
FIG. 2 is a block diagram of a workstation according to an embodiment of the disclosure.

Turning now to FIG. 2, details of the workstations 112 are described. In an embodiment, the workstation 112 comprises a processor 130, a memory 132, and a user interface 134. The memory 132 may comprise a plurality of parser definition (PDEF) files 138 and a messaging tool 136. The messaging tool 136 comprises optionally a plurality of software classes 140 derived from the PDEF files 138, a fixed length message builder module 142, and a fixed length message parser module 144. The PDEF files 138, the builder 142, and the parser 144 may be stored in a non-transitory area of the memory 132. The user interface 134 may be provided by a keyboard and a display screen. The user interface 134 may be provided as a touchscreen. The user interface 134 may also be used to refer to the presentation of an interactive user interface screen, such as a graphical user interface (GUI). In some contexts, the messaging tool 136 may be referred to as a message generation application.

In an embodiment, when the messaging tool 136 is initialized or launched, the builder 142 and/or the parser 144 analyze the PDEF files 138 and instantiate Java classes based on that analysis. The builder 142 and the parser 144 then perform their functions based on interacting with and using the Java classes. In another embodiment, however, the software classes 140 are not instantiated and instead the builder 142 and the parser 144 work directly with the PDEF files 138. Because the messaging tool 136 is configured or executes based, at least in part, on the content of the PDEF files 138, the messaging too 136 may be said to be a data driven software application. In an embodiment, the messaging tool 136 is delivered as a zip file which is unzipped and installed in the memory 132 by the user of the workstation 112.

Alternatively, the messaging tool 136 may be delivered as a web application. For example, the workstation 112 may access a builder 142 or a parser 144 via a browser application executing on the workstation 112 from an application server via the network 104. The application server may store the PDEF files 138 and the software classes 140 in memory accessible to the application server and execute the builder 142 and parser 144 in a server processor. What the workstation 112 presents on the user interface 134 is just an interface to the functionality provided by the application server. While the description hereinafter focuses on the configuration of the messaging tool 136 depicted in FIG. 2, it is noted that an alternative web application architecture implementation is also contemplated by the present disclosure.

Each PDEF file 138 defines the structures associated with one API and/or message format. The API may be used to invoke a function or service provided by a back-end application 108 or provide a response to a front-end application 102. Because APIs may undergo evolution and modification over time—either within a development cycle or over the course of different production releases—each PDEF file 138 may define formats associated with a plurality of versions of its associated API. The PDEF files 138 define the fields that compose an API and/or message and a fixed length of the fields. The PDEF files 138 may be crafted manually by an analyst or an information technology (IT) worker based on API specification documents.

The optional software classes 140, if they are used by the message tool 136, may be created by the builder 142 and/or the parser 144 based on the PDEF files 138, providing the information contained in the PDEF files 138 in a form more readily useable at run-time by the builder 142 and the parser 144. When created, the software classes may be stored in a transitory portion of the memory 132, for example in fast RAM.

Figure 3:
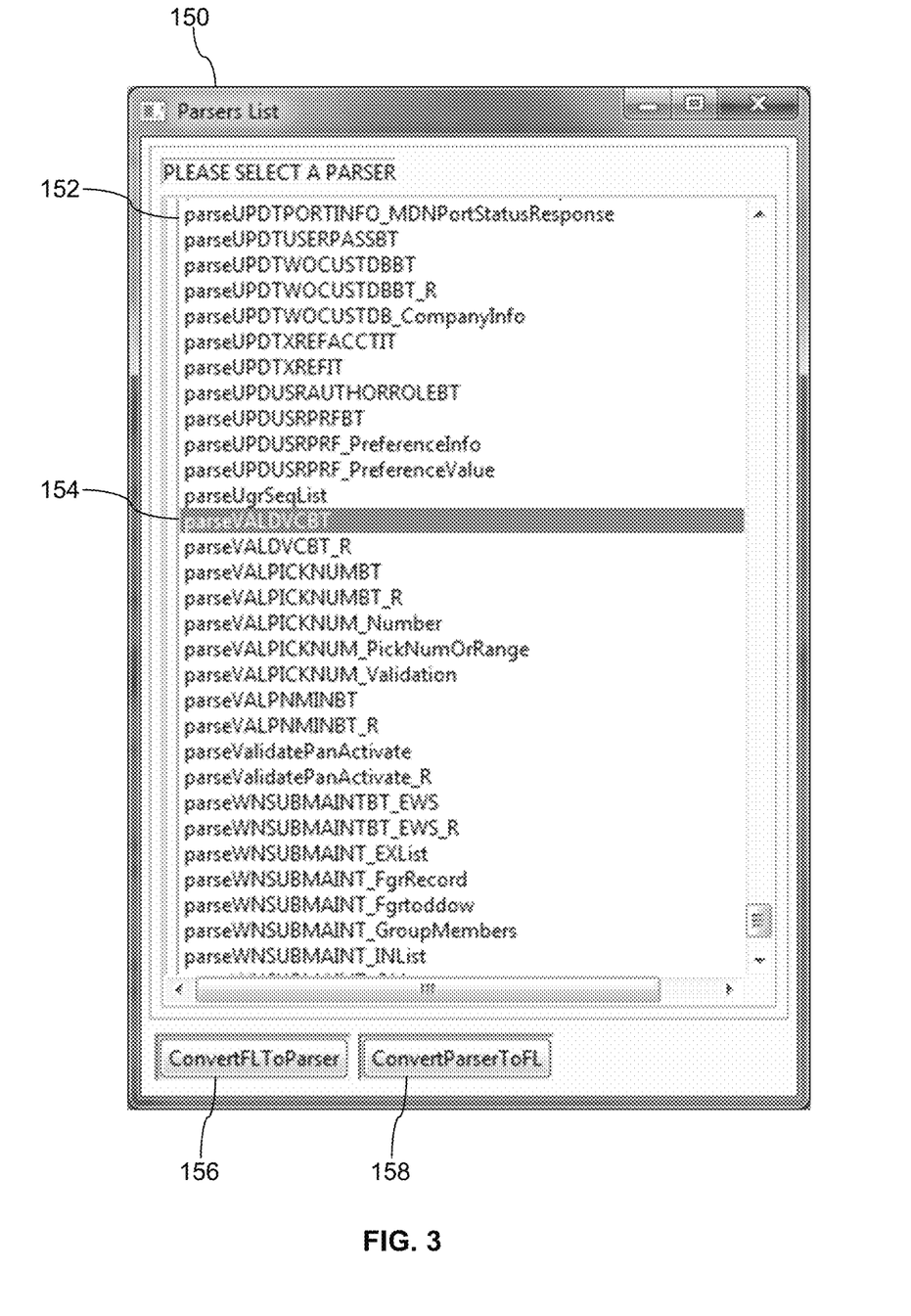
FIG. 3 is an illustration of a first user interface screen according to an embodiment of the disclosure.

Turning now to FIG. 3, a first exemplary user interface screen 150 is described. The screen 150 may be displayed when the messaging tool 136 is executed by the workstation 112. The screen 150 may display a plurality of API identities 152 or parser identities (the term "parser" may be used to apply to a corresponding API). By clicking on one of the API identities 154 the API identity is selected and highlights in the screen 150. The user can then activate a convert fixed length message to parsed fields button 156 or a convert parsed fields to fixed length message button 158 to invoke the corresponding function of the messaging tool 136. The convert fixed length message to parsed fields button 156 may activate the fixed length message parser module 144. The convert parsed fields to fixed length message button 158 may activate the fixed length message builder module 142. It is understood that in another embodiment, the screen 150 may be presented in a different format and present different information.

Figure 4:
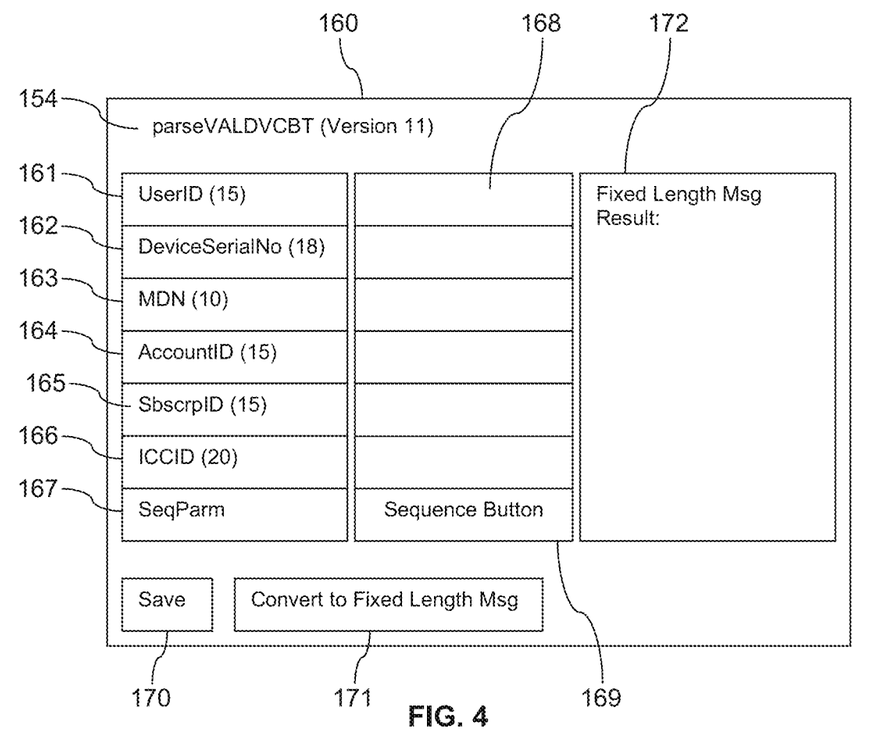
FIG. 4 is an illustration of a second user interface screen according to an embodiment of the disclosure.

Turning now to FIG. 4, a second exemplary user interface screen 160 is described. The screen 160 may be displayed when the convert parsed fields to fixed length message button 158 is activated. In an embodiment, the screen 160 may be used to input data into fields and to convert the data to a fixed length message, for example by executing the fixed length message builder module 142. In an embodiment, the screen 160 comprises an API identity 154 (e.g., a parser identity), a plurality of field identities 161-166, a sequence parameter identity 167, a plurality of input fields 168 for inputting data for the associated field identities, a sequence input button 169, a save button 170, a convert to fixed length message button 171, and a fixed length message result window 172. It is understood that a small number of field identities and corresponding input fields are shown in FIG. 4 to avoid cluttering the illustration. In practice, the screen 160 may comprise many more field identities and corresponding input fields, and the user may use a scrolling button to scroll up and down in a list of field identities and corresponding input fields to provide data input to the screen 160. In an embodiment, the input scree 160 may further comprise a drop-down list of different API versions (e.g., business transaction versions) to select and a drop-down list of different header versions to select. It is understood that in another embodiment, the screen 160 may be presented in a different format and present different information. The screen 160 is dynamically constructed by the fixed length message builder module 142, for example based on the selection of an API version and/or a selection of an API.

Figure 5:
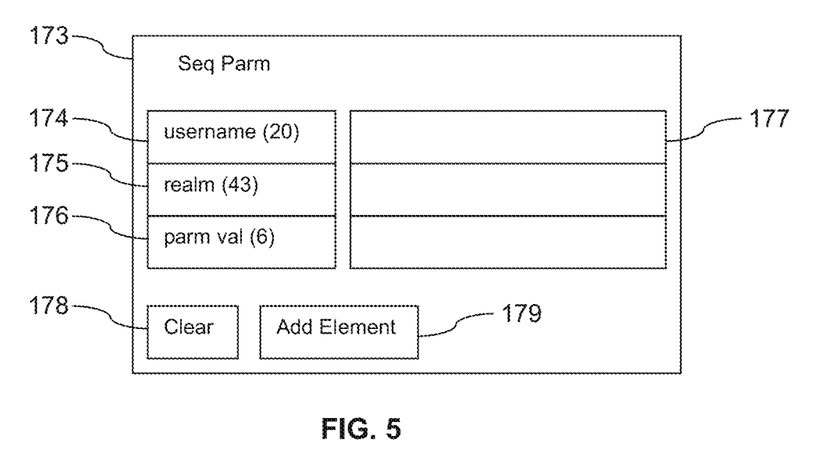
FIG. 5 is an illustration of a third user interface screen according to an embodiment of the disclosure.

Turning now to FIG. 5, a third exemplary user interface screen 173 is described. When the sequence button 169 is activated, the screen 173 may be presented on the user interface 134. The screen 173 provides field names 174, 175, 176 and corresponding value input boxes 177. The value input boxes 177 may be referred to as editable fields in some contexts. The screen 173 provides a clear button 178 and an add element button 179. The sequence screen 173 promotes a user providing inputs for fields 177 of a sequence object. By activating the clear button 178, the user can clear values in the input boxes 177. By activating the add element button 179, the user can cause the messaging tool 136 (e.g., the parser to fixed length message builder module 142) to pop-up another instance of the screen 173 for defining data values of another instance of the sequence object. The sequence objects may comprise record structures, where each instance of a record structure comprises multiple fields. In some cases, a field of a record structure may itself represent a record structure (e.g., an embedded record structure or a nested record structure). The messaging tool 136 pads or truncates values in the input boxes 177 as needed to satisfy the fixed length requirements of the different fields of the sequence object, as defined by the PDEF files 138 and/or the classes 140. It is understood that in another embodiment, the screen 173 may be presented in a different format and present different information. The screen 173 may support adding sequence objects, modifying sequence objects, and deleting sequence objects.

Figure 6:
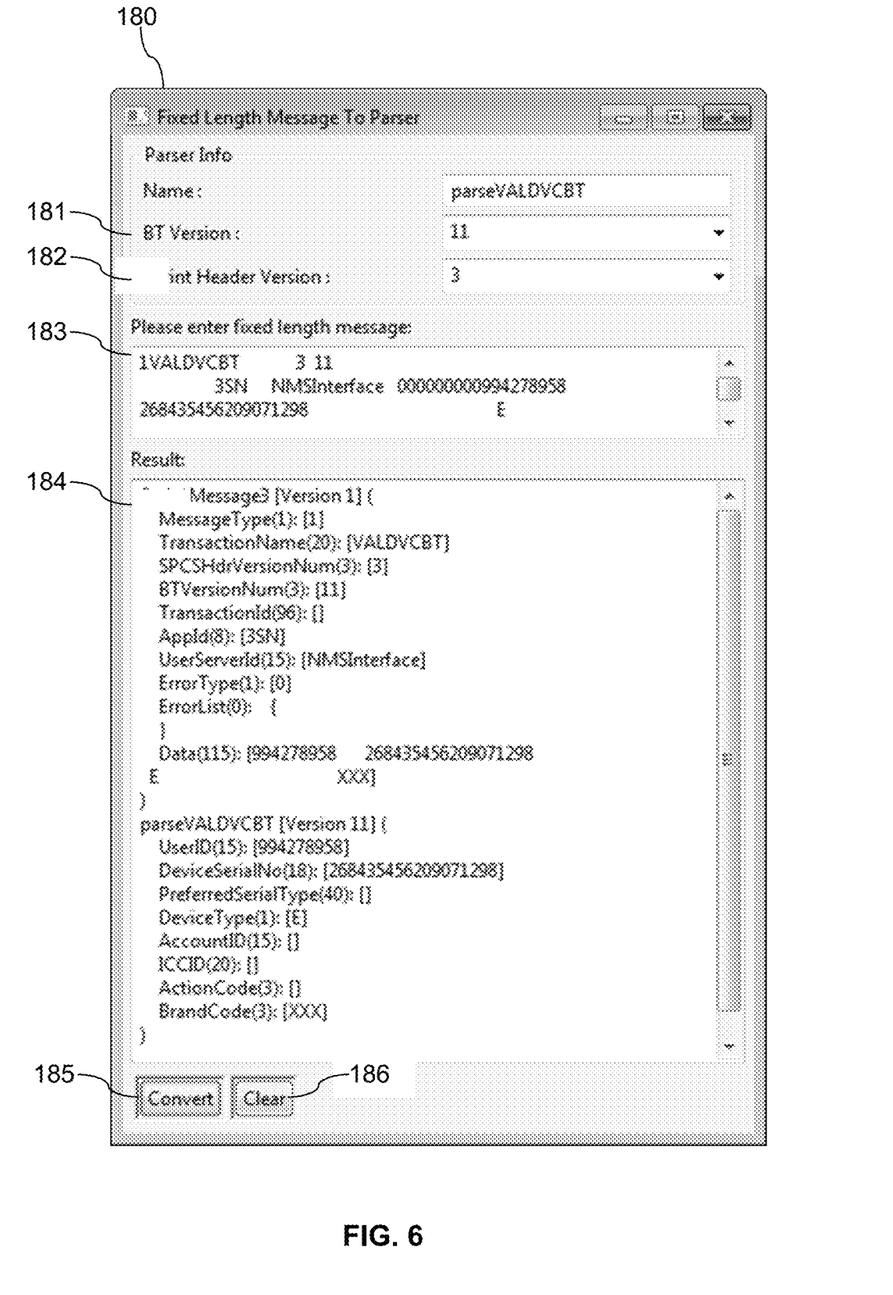
FIG. 6 is an illustration of a fourth user interface screen according to an embodiment of the disclosure.

Turning now to FIG. 6, a fourth exemplary user interface screen 180 is described. The screen 180 may be presented when the convert fixed length message to parsed fields button 156 is activated on the screen 150 by the user. The screen 180 comprises an API version list 181 (e.g., a business transaction (BT) version), a header version list 182, a fixed length message input field 183, a plurality of parsed message fields 184, a convert button 185, and a clear button 186. When using screen 180, the user may be assumed to have at hand a fixed length message that he or she wants to convert to a parsed message, to convert to a message segmented into field values associated to names of the fields. To support the fixed length message parser module 144 performing this task, the user needs to indicate what message format the parser 144 ought to use to parse the fixed length message. This may comprise selecting an API version from the API version list 181 and selecting a header version from the header version list 182. The parser 144 then parses the fixed length message provided in the fixed length message input field 183 based on the contents of the PDEF file 138 and/or classes based on the selected API version and header version. It is understood that in another embodiment, the screen 180 may be presented in a different format and present different information.

Figure 7:
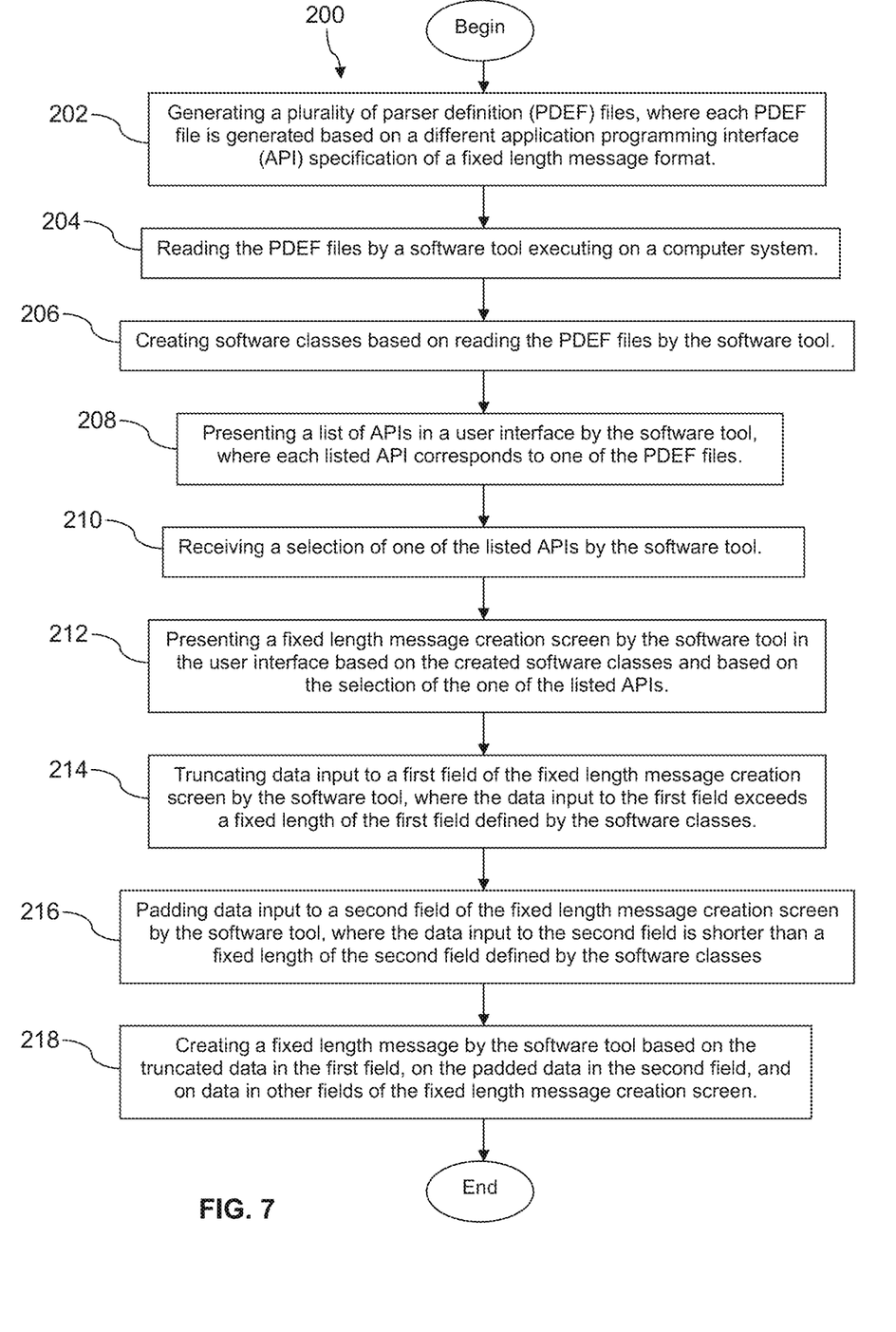
FIG. 7 is a flow chart of a method according to an embodiment of the disclosure.

Turning now to FIG. 7 a method 200 is described. In an embodiment, the method 200 is a method of building a fixed length electronic communication message by a software tool. At block 202, the method 200 comprises generating a plurality of parser definition (PDEF) files, where each PDEF file is generated based on a different application programming interface (API) specification of a fixed length message format. The processing of block 202 may be performed by IT workers based on API specifications provided by analysts or software developers.

At block 204, the method 200 comprises reading the PDEF files by a software tool executing on a computer system. At block 206, the method 200 comprises creating software classes based on reading the PDEF files by the software tool. The software classes may be Java classes, C++ classes, or some other object oriented programming language classes. In another embodiment, however, the processing of 206 does not occur, and subsequent processing of method 200 is performed based at least in part on accessing the PDEF files rather than accessing the software classes.

At block 208, the method 200 comprises presenting a list of APIs in a user interface by the software tool, where each listed API corresponds to one of the PDEF files. At block 210, the method 200 comprises receiving a selection of one of the listed APIs by the software tool. The method 200 may further comprise presenting a list of API versions associated with the selected API by the software tool in the user interface, and receiving a selection of one of the listed API versions by the software tool.

At block 212, the method 200 comprises presenting a fixed length message creation screen by the software tool in the user interface based on the created software classes and based on the selection of the one of the listed APIs. In an embodiment, presenting the fixed length message creation screen is further based in part on the selected API version. In an embodiment, presenting the fixed length message creation screen comprises dynamically generating the fixed length message creation screen. In an embodiment, the fixed length message screen comprises editable fields, wherein some of the editable fields represent a record structure. A record structure may be a sequence object that comprises a plurality of elements, objects, or fields. In an embodiment, at least one of the editable fields represents a sequence of record structures. The record structures may be defined by one or more PDEF files. In an embodiment, a field of a record structure itself represents a sequence of record structures, a second level of record structures relative to the record structure it is a part of. The second level of record structures may be defined by one or more PDEF files. This may be referred to in some contexts as nesting of PDEF files. For example a PDEF file may define a record structure in terms of fields that themselves are defined by other PDEF files. At block 214, the method 200 comprises truncating data input to a first field of the fixed length message creation screen by the software tool, where the data input to the first field exceeds a fixed length of the first field defined by the software classes. In an embodiment, the truncating of the data input is based in part on the selected API version.

At block 216, the method 200 comprises padding data input to a second field of the fixed length message creation screen by the software tool, where the data input to the second field is shorter than a fixed length of the second field defined by the software classes. In an embodiment, the padding of the data input is based in part on the selected API version. At block 218, the method 200 comprises creating a fixed length message by the software tool based on the truncated data in the first field, on the padded data in the second field, and on data in other fields of the fixed length message creation screen. In an embodiment, creating the fixed length message is based in part on the selected API version. In an embodiment, the processing of method 200 may further comprise cutting and pasting the fixed length message into a convert fixed length message to parsed fields user interface screen, converting the fixed length message to a plurality of fields, and confirming that the fields comprise correct data.

In an embodiment, the processing of method 200 may further comprise cutting and pasting the fixed length message into a message input field of a different testing tool for transmitting the message to a messaging server 106 or to a messaging middleware layer of a three-tier architecture computer system. In an embodiment, the processing of method 200 further comprises automatically transmitting the fixed length message to a messaging server 106 or to a messaging middleware layer of a three-tier architecture computer system. In an embodiment, the method 200 further comprises receiving a response message by the software tool from the messaging server 106 in a fixed length message format, parsing the response message by the software tool based on a PDEF file, and presenting the response message in fields by the software tool on the user interface.

Figure 8A:
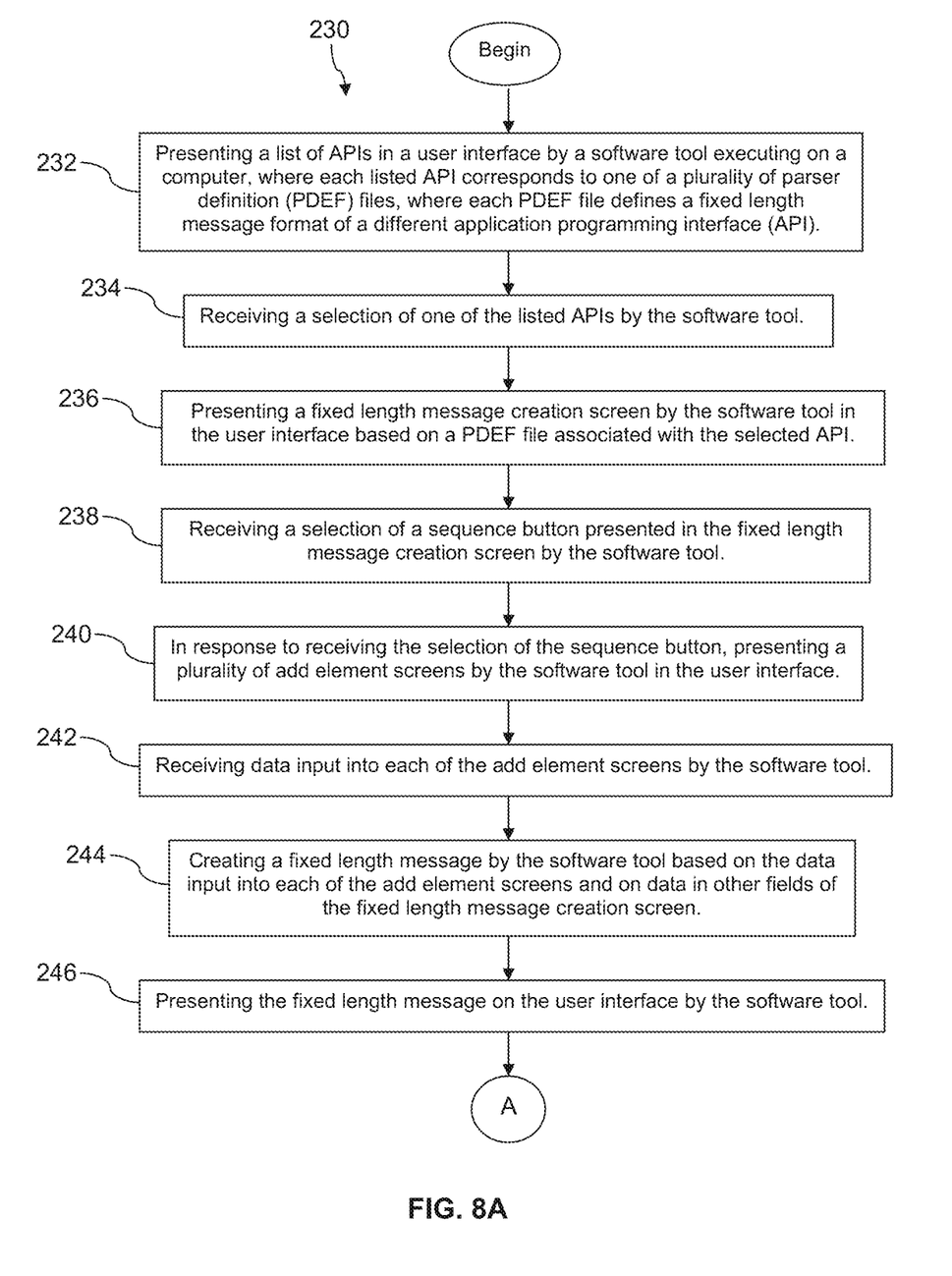
FIG. 8A and FIG. 8B are a flow chart of another method according to an embodiment of the disclosure.
Figure 8B:
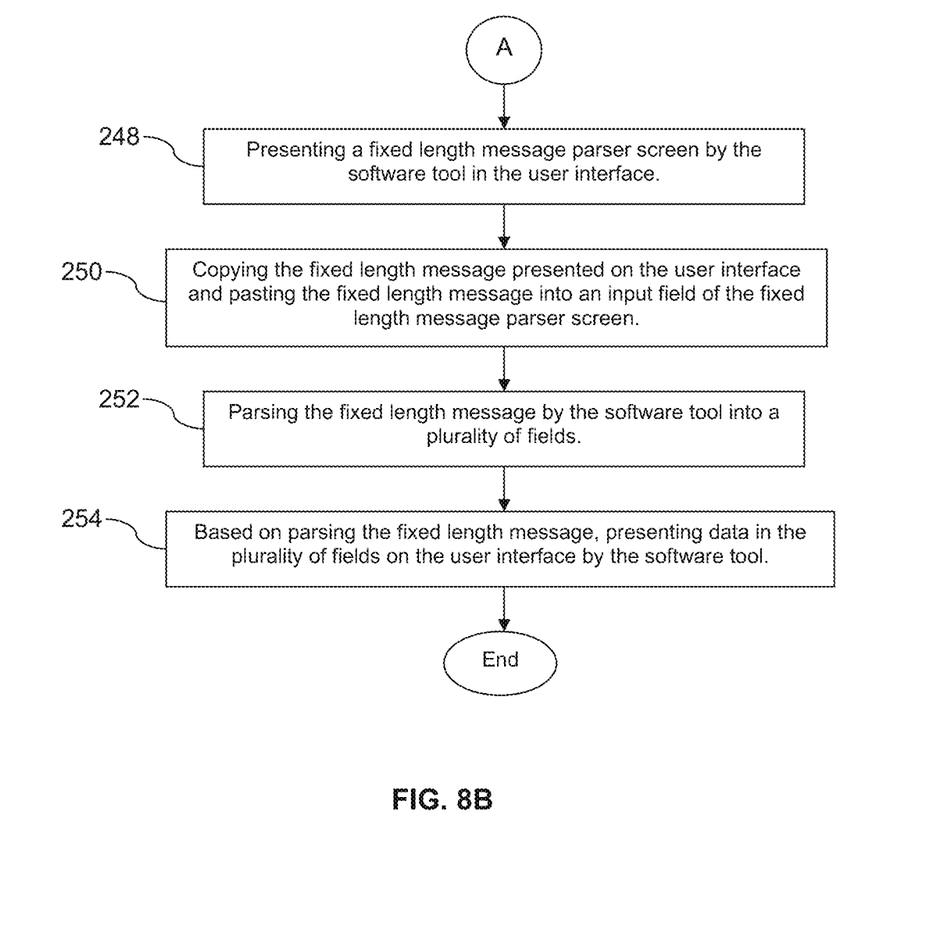

Turning now to FIG. 8A and FIG. 8B, a method 230 is described. In an embodiment, the method 230 is a method of building a fixed length electronic communication message by a software tool. At block 232, the method 230 comprises presenting a list of APIs in a user interface by a software tool executing on a computer, where each listed API corresponds to one of a plurality of parser definition (PDEF) files, where each PDEF file defines a fixed length message format of a different application programming interface (API).

At block 234, the method 230 comprises receiving a selection of one of the listed APIs by the software tool. In an embodiment, the processing of blocks 232 and 234 may further comprise presenting a list of API versions for selection and receiving a selection of one of the listed API versions. The format of the fixed length message creation screen presented by the software tool (see further below) may be adapted by the software tool based on the selection of the API version, due to differences in message format among different API versions. In an embodiment, the processing of blocks 232 and 234 may further comprise presenting a list of message header versions for selection and receiving a selection of one of the listed message header versions.

At block 236, the method 230 comprises presenting a fixed length message creation screen by the software tool in the user interface based on a PDEF file associated with the selected API. At block 238, the method 230 comprises receiving a selection of a sequence button presented in the fixed length message creation screen by the software tool. At block 240, the method 230 comprises, in response to receiving the selection of the sequence button, presenting a plurality of add element screens (e.g., screen 173—a sequence object input screen) by the software tool in the user interface. In an embodiment, the add element screens support sequence object creation, sequence object update, and sequence object deletion. A sequence object may be a record structure that comprises a plurality of fields.

At block 242, the method 230 comprises receiving data input into each of the add element screens by the software tool. At block 244, the method 230 comprises creating a fixed length message by the software tool based on the data input into each of the add element screens and on data in other fields of the fixed length message creation screen.

At block 246, the method 230 comprises presenting the fixed length message on the user interface by the software tool. At block 248, the method 230 comprises presenting a fixed length message parser screen by the software tool in the user interface.

At block 250, the method 230 comprises copying the fixed length message presented on the user interface and pasting the fixed length message into an input field of the fixed length message parser screen. At block 252, the method 230 comprises parsing the fixed length message by the software tool into a plurality of fields. At block 254, the method 230 comprises, based on parsing the fixed length message, presenting data in the plurality of fields on the user interface by the software tool. The processing of method 230 may further comprise automatically sending the fixed length message to a messaging middleware layer, for example to a messaging server 106.

Figure 9:
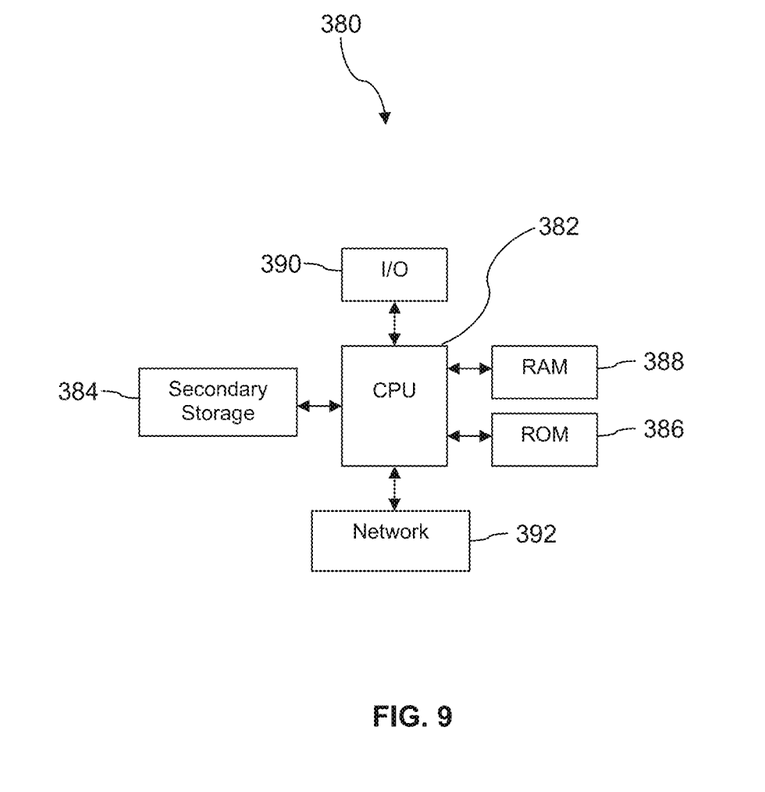
FIG. 9 is a block diagram of a computer system according to an embodiment of the disclosure.

FIG. 9 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of building a fixed length electronic communication message by a software tool, comprising:
    generating a plurality of parser definition (PDEF) files, where each PDEF file is generated based on a different application programming interface (API) specification of a fixed length message format;
    reading the PDEF files by a software tool executing on a computer system;
    creating software classes based on reading the PDEF files by the software tool;
    presenting a list of APIs in a user interface by the software tool, where each listed API corresponds to one of the PDEF files;
    receiving a selection of one of the listed APIs by the software tool;
    presenting a fixed length message creation screen by the software tool in the user interface based on the created software classes and based on the selection of the one of the listed APIs;
    truncating data input to a first field of the fixed length message creation screen by the software tool, where the data input to the first field exceeds a fixed length of the first field defined by the software classes;
    padding data input to a second field of the fixed length message creation screen by the software tool, where the data input to the second field is shorter than a fixed length of the second field defined by the software classes; and
    creating a fixed length message by the software tool based on the truncated data in the first field, on the padded data in the second field, and on data in other fields of the fixed length message creation screen.

2. The method of claim 1, wherein presenting the fixed length message creation screen comprises dynamically generating the fixed length message creation screen.

3. The method of claim 2, wherein the fixed length message creation screen comprises editable fields, wherein some of the editable fields represent a record structure.

4. The method of claim 2, wherein the fixed length message creation screen comprises editable fields, wherein at least one of the editable fields represents a sequence of record structures.

5. The method of claim 1, further comprising providing the fixed length message to a middleware software application, whereby the fixed length message is conveyed to a backend application for processing by the middleware software application.

6. The method of claim 1, further comprising transmitting the fixed length message by the software tool to a messaging server.

7. The method of claim 6, further comprising:
    receiving a response message by the software tool from the messaging server in a fixed length message format;
    parsing the response message by the software tool based on a PDEF file; and
    presenting the response message in fields by the software tool on the user interface.

8. A computer system, comprising:
    a processor;
    a non-transitory memory;
    a plurality of parser definition (PDEF) files stored in the non-transitory memory, where each PDEF file defines a fixed length message format of a different application programming interface (API); and
    a message generation application stored in the non-transitory memory that, when executed by the processor:
        presents a list of APIs in a user interface, where each listed API corresponds to one of the PDEF files,
        receives a selection of one of the listed APIs,
        presents a fixed length message creation screen in the user interface, wherein the fixed length message creation screen is dynamically generated based on a PDEF file associated with the selected API,
        truncates data input to a first field of the fixed length message creation screen, where the data input to the first field exceeds a fixed length of the first field defined by the PDEF file associated with the selected API,
        pads data input to a second field of the fixed length message creation screen, where the data input to the second field is shorter than a fixed length of the second field defined by the PDEF file associated with the selected API, and
        creates a fixed length message based on the truncated data in the first field, on the padded data in the second field, and on data in other fields of the fixed length message creation screen.

9. The computer system of claim 8, wherein the fixed length message creation screen comprises editable fields, at least one of the editable fields represents a sequence of record structures, and the record structure is defined by a PDEF file.

10. The computer system of claim 9, wherein the fixed length message creation screen comprises at least one editable field representing a sequence of record structures, wherein a field of the record structure itself represents a sequence of record structures.

11. The computer system of claim 8, wherein the message generation application creates software classes based on analyzing the PDEF files, and wherein message generation application presents the fixed length message creation screen in the user interface, truncates data input to the first field, and pads data input to the second field based on the software classes.

12. The computer system of claim 8, wherein the message generation application further
presents a list of API versions associated with the selected API in the user interface, and
receives a selection of one of the listed API versions,
wherein the message generation application presents the fixed length message creation screen in the user interface, truncates data input to the first field, and pads data input to the second field based on the software classes based further on the selected API version.

13. The computer system of claim 8, wherein the message generation application is a data driven software application.

14. The computer system of claim 8, wherein the message generation application is a bidirectional converter operable to convert a plurality of fields to a fixed length message and to convert a fixed length message to a plurality of fields.

15. A method of building a fixed length electronic communication message by a software tool, comprising:
presenting a list of application programming interfaces (APIs) in a user interface by a software tool executing on a computer, where each listed API corresponds to one of a plurality of parser definition (PDEF) files, where each PDEF file defines a fixed length message format of a different application API;
receiving a selection of one of the listed APIs by the software tool;
presenting a fixed length message creation screen by the software tool in the user interface based on a PDEF file associated with the selected API;
receiving a selection of a sequence button presented in the fixed length message creation screen by the software tool;
in response to receiving the selection of the sequence button, presenting a plurality of add element screens by the software tool in the user interface;
receiving data input into each of the add element screens by the software tool;
creating a fixed length message by the software tool based on the data input into each of the add element screens and on data in other fields of the fixed length message creation screen;
presenting the fixed length message on the user interface by the software tool;
presenting a fixed length message parser screen by the software tool in the user interface;
copying the fixed length message presented on the user interface and pasting the fixed length message into an input field of the fixed length message parser screen;
parsing the fixed length message by the software tool into a plurality of fields;
based on parsing the fixed length message, presenting data in the plurality of fields on the user interface by the software tool; and
transmitting the created fixed length message to a messaging server.

16. The method of claim 15, wherein the add element screens presented in response to selection of the sequence button support sequence object creation, sequence object update, and sequence object deletion.

17. The method of claim 15, wherein the messaging server is located in a core network of a communication service provider.

18. The method of claim 15, wherein the messaging server and the computer that the software tool executes on are part of a testing environment of a communication service provider.

19. The method of claim 15, further comprising:
presenting a list of API versions associated with the selected API by the software tool in the user interface, and
receiving a selection of one of the listed API versions by the software tool,
wherein presenting the fixed length message creation screen in the user interface, presenting the plurality of add element screens in the user interface, and creating the fixed length message are based in part on the selected API version.

* * * * *

UNITED STATES PATENT AND TRADEMARK OFFICE
CERTIFICATE OF CORRECTION

| | | |
|---|---|---|
| PATENT NO. | : 10,872,005 B1 | Page 1 of 1 |
| APPLICATION NO. | : 16/429889 | |
| DATED | : December 22, 2020 | |
| INVENTOR(S) | : Erny Kilis | |

It is certified that error appears in the above-identified patent and that said Letters Patent is hereby corrected as shown below:

On the Title Page

The inventor's name should be: "Erny Kilis" instead of "Erny Killis"

Signed and Sealed this
Twenty-third Day of May, 2023

Katherine Kelly Vidal
*Director of the United States Patent and Trademark Office*